June 9, 1953  R. J. C. ROQUET  2,641,739
VOLTAGE CONTROLLER
Filed July 28, 1948  2 Sheets-Sheet 1

INVENTOR
RAYMOND J. C. ROQUET
BY Haseltine Lake and Co,
AGENTS

June 9, 1953  R. J. C. ROQUET  2,641,739
VOLTAGE CONTROLLER
Filed July 28, 1948  2 Sheets-Sheet 2

INVENTOR
RAYMOND J. C. ROQUET

BY Hazeltine Lake and Co.,
AGENTS

Patented June 9, 1953

2,641,739

UNITED STATES PATENT OFFICE 2,641,739

VOLTAGE CONTROLLER

Raymond Jacques Charles Roquet, Paris, France

Application July 28, 1948, Serial No. 41,289
In France August 27, 1947

8 Claims. (Cl. 323—75)

The present invention has for its object a device to allow reversing the difference of potential produced by a source at the input terminals of an electric circuit by means of a reverser, while keeping between said terminals the constancy of said difference of potential in terms of the modulus, in spite of the internal resistance of the source.

It applies in particular, to signalling and telegraphy where the difference of potential at the input of a working circuit must be reversed and where the constant of this difference of potential (in modulus) is of prime importance, even if the strength is not the same for the two directions of the current and even if the quantity of current is different for these two directions of the current during a period of operation.

The invention will now be described in its application to telegraphy, without the scope of the invention being limited to this particular use.

The usual means for reversing the direction of the current in a transmission channel in bivalent modulation and with double current, consists in having two sources, each for one direction of the current, one or the other being put in circuit by the signals transmitting member. Experience proves and theory confirms that if the two sources are storage batteries, the quantities of current they deliver during the course of a period of operation being not equal, their E. M. F.'s are not, or do not remain equal (in modulus) and that, if the sources are not storage batteries and have a rather high inner impedance, this contributes toward creating a transitory condition which takes place in the transmission channel and may, by its presence, increase the rate of distortion of the modulation received at the other end of that channel.

The device, the object of the present invention, obviates these drawbacks. It consists in reversing a source of E. M. F. by means of the usual telegraph transmitter and it includes a set of resistances and rectifying cells suitably biased by an auxiliary source whose E. M. F. may, moreover, vary accidentally (in modulus) in large proportions without perceptibly modifying the current in the line.

Figure 1:
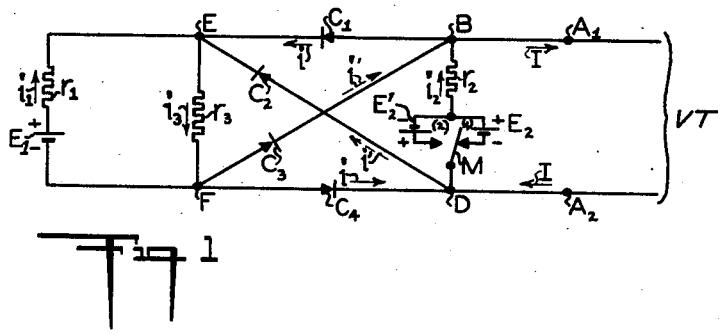
Figure 3:
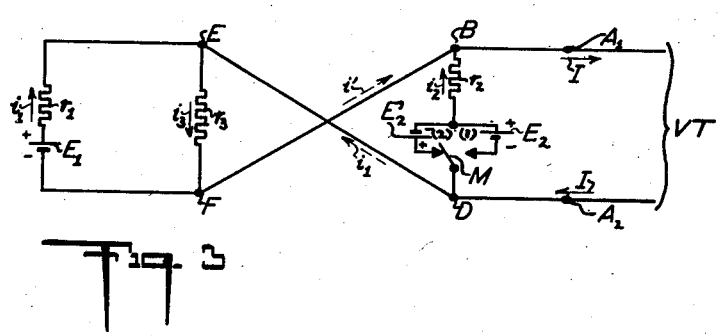
Figure 4:
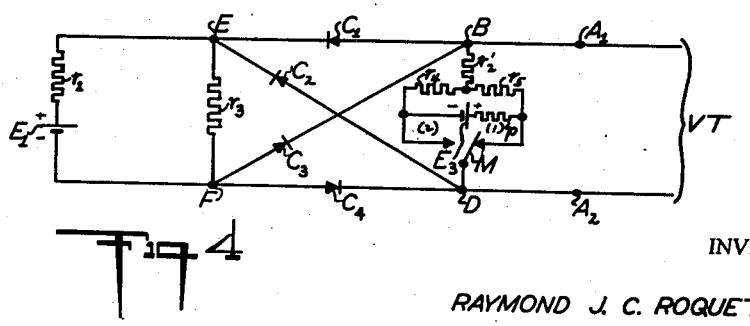
Figure 5:
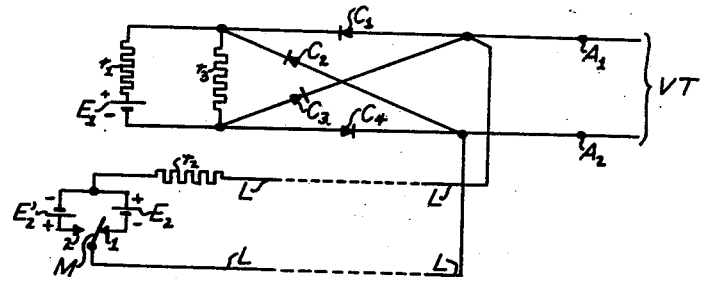
Figure 6:
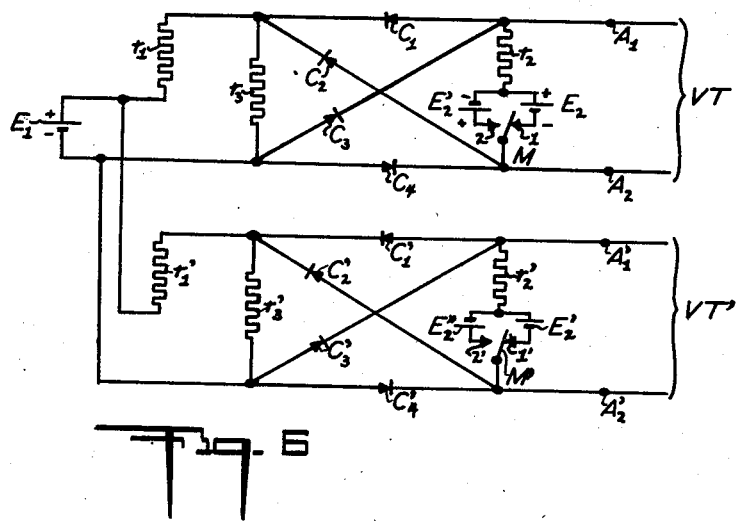
Figure 7:
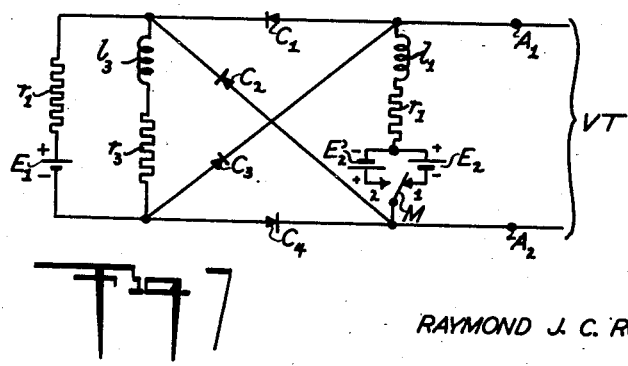

In order that the invention may be more clearly understood, the device will now be described by way of example with reference to the accompanying drawing, in which Fig. 1 is a wiring diagram of a first embodiment, Figs. 2 and 3 being partial views of the same diagram in two operative positions, and Fig. 4 is a similar view of a modification. Figures 5, 6 and 7 show variations of the invention.

The drawing of the device in its preferred form of embodiment is given in Fig. 1, in which:

M is the bivalent modulating telegraph transmitter adapted to take up the positions 1 and 2.

$E_1$, $E_2$, $E_2'$ are the sources of E. M. F. whose E. M. F.'s are respectively $e_1$, $e_2$, and $e_2'$.

$r_1$, $r_2$, $r_3$ are the resistances.

$C_1$, $C_2$, $C_3$, $C_4$ are the rectifying cells.

VT is the telegraph transmission channel whose input terminals are $A_1$ and $A_2$.

$i$, $i'$, $i_1$, $i_2$, $I_3$, I, are the current intensities taken in the positive direction of the arrows.

The connections are supposed to be without resistance.

The sources of E. M. F. and the cells are oriented as shown in the figure.

The modulating transmitter M, called modulator, is a modulator of any model with two contacts, or a similar modulator such as are used on telegraph apparatus in service. This may, for instance, be a Morse signalling key or an assembly of two transmitting crowns of the Baudot system or the transmitting lever and the stops of an arythmic relay, or the moving part and the stops of an intermediate relay.

The source $E_1$ is of any desired nature, provided that its E. M. F. $e_1$ is constant. The resistance $r_1$ represents the internal resistance of said source. The source $E_1$ will be referred to as "standard source."

The sources of E. M. F. $E_2$ and $E_2'$ are of any desired nature (batteries, storage batteries, dry rectifiers or lamps, rotary generators, etc.) but having internal resistances nominally equal.

The resistance $r_2$ includes the common internal resistance of these sources. Their E. M. F.'s $e_2$ and $e_2'$ respectively, nominally equal in modulus, may be different in fact, in a certain measure which will be pointed out. The sources $E_2$ and $E_2'$ will be referred to as "auxiliary sources."

The cells $C_1$, $C_2$, $C_3$, $C_4$ have as small a direct resistance as possible and as great a reverse resistance as possible. The values of their direct resistance and their reverse conductance will be considered as zero, to simplify.

In the example chosen, to facilitate the description, VT is the telegraph transmission channel; but in fact VT may include the transmission channel itself and the shuntings which may possibly be made for controlling the transmitted signals or for any other uses. In a more general manner, VT must be taken as being the working circuit.

It is supposed in the first place, that the modulator M whose movable finger is in position 1, puts in the circuit, the source $E_2$.

The resistances and the E. M. F.'s may be determined so that the electric potential of the point B is higher than that of point E, and that of point F higher than that of point D.

This condition being fulfilled, the cells $C_1$ and $C_4$ let the current pass whilst the cells $C_2$ and $C_3$ present to its flow a very high resistance, supposed infinitely high, for the sake of simplicity.

Figure 2:
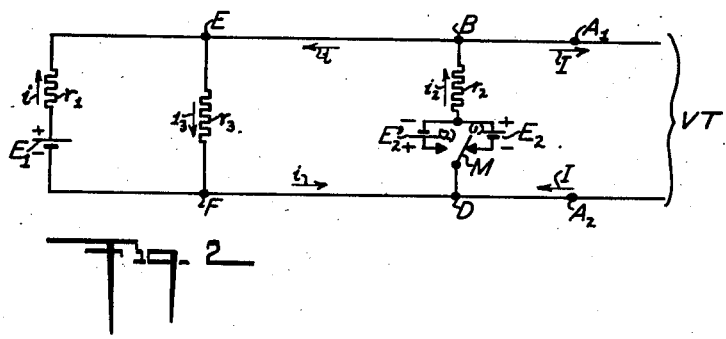

The electric network is then in accordance with the diagram of Fig. 2.

So that the above conditions may be carried out, it is necessary to adjust the resistances and the E. M. F. either experimentally or else by calculating so that the current I is positive (that is to say that it flows in the direction of the arrow to which it is referred, Figs. 1 and 2).

The input terminals $A_1$ and $A_2$ of the transmission channel are then in direct connection with the source $E_1$ through the single resistance $r_1$.

In the second place, it is supposed that the movable part of the modulator M (Fig. 1) upon passage to position 2 puts the source $E_2'$ in circuit instead of the source $E_2$, all other things remaining equal.

The E. M. F. $e_2$ in the branch BD (Fig. 1) having been replaced by its reverse $e_2'$, the potential of the point D is this time higher than that of the point E, and that of point F is higher than that of point B. A current $i'$ flows in the cells $C_2$ and $C_3$, according to the dotted line arrows of Fig. 1, while no current flows in the cells $C_1$ and $C_4$. The current $i'$ is moreover equal to current $i$.

The electric circuit then corresponds to the diagram of Fig. 3 on which the direction of the arrows of the Fig. 1 has to be adhered to, as showing the positive direction of the current.

The terminals $A_1$ and $A_2$ (Fig. 3) are still connected with the source $E_1$ through the single resistance $r_1$, but with reversal of the connections between EF and BD in relation to the drawings of the Fig. 2.

Thus, when the moving part of the modulator M (Fig. 1) changes its stop contact, the difference of potential between the input terminals $A_1$ and $A_2$ of the channel is reversed and the current I changes direction without their modulus being modified.

If the source $E_1$ shows a negligible internal resistance $r_1$, the difference of potential between B and D remains equal in modulus to $e_1$ and the modulus of the intensity I is independent of $r_2$, $r_3$ and $e_2$ (or $e_2'$) provided that the conditions of gradation of the potential shown for the terminals B, D, E, F, are adhered to.

If the source $E_1$ has a nonnegligible internal resistance $r_1$, the modulus of I in general depends on $r_1$ unless the current $i_1$ is zero. Nevertheless the elements entering into the constitution of the diagram may be determined so that the intensity $i_1$ remains nominally at zero, and so that in normal service it remains small in any case.

Indicating by R the resistance of the transmission channel whose reactance is omitted, and supposing for instance that $e_2$ is the E. M. F. brought into play by the modulator M, the intensities I, $i$ and $i_1$ in permanent operation, are expressed by the following formulas:

(1) $$I = \frac{e_1 r_2 r_3 + e_2 r_3 r_1}{d}$$

(2) $$i = \frac{e_2 R(r_1 + r_3) - e_1 r_3 (R + r_2)}{d}$$

(3) $$i_1 = \frac{e_1[R(r_2 + r_3) + r_2 r_3] - e_2 R r_3}{d}$$

(4) $$d = R(r_2 r_3 + r_3 r_1 + r_1 r_2) + r_1 r_2 r_3$$

to which must be joined the condition ($i > 0$) by means of which the gradation of the potential for the points B, D, E, F, is ensured, to wit:

(5) $$e_2 R(r_1 + r_3) > e_1 e_3 (R + r_2)$$

The intensity $i_1$ is zero if:

(6) $$e_1[R(r_2 + r_3) + r_2 r_3] = e_2 R r_3$$

The relation (6) being fulfilled, the current intensity flowing in the transmission channel is:

$$I = \frac{e_1}{R}$$

That is to say that the source $E_1$ acts like a source without internal resistance.

It may happen that, for different reasons, the intensity $i_1$ is not, or does not remain, exactly at zero. In this case, and supposing for instance that $e_2$ is the variable, the relative error on I is given by the following formula:

(7) $$\frac{\Delta I}{I} = \frac{\Delta e_2}{e_2}\left[1 - \frac{1}{1 + r_1\left(\frac{1}{r_2} + \frac{1}{r_3} + \frac{1}{R}\right)}\right]$$

This error is all the more small as $r_1$ is smaller before in $r_2$, $r_3$ and R. It is zero in particular when $r_1 = 0$, which approximately results in practice if $E_1$ is a storage battery. For instance, if $r_1$ is about a thousandth of $r_2$, $r_3$ and R, the relative error $$\frac{\Delta I}{I}$$

is about $3/1{,}000$ of the relative variation of $e_2$.

According to the expression (6), $e_2$ is always higher than $e_1$, and these two E. M. F.'s differ all the more as $r_2$ is greater (all other things being equal).

According to the Expression 7, the relative irregularity $$\frac{\Delta I}{I}$$

is all the greater as $r_2$ is smaller (all other things being equal). By means of these two statements, for a given relative irregularity $$\frac{\Delta I}{I}$$

(not to be exceeded) $r_2$ is chosen all the bigger (and eventually $e_2$) as the E. M. F. $e_2$ is more irregular.

A source $E_2$ may therefore be used of secondrate quality (high internal resistance, E. M. F. irregular) like an alternating current rectifier for instance, provided with a rudimentary filter. A storage battery may also be used with variable E. M. F. during the course of the discharge, like certain models with alkaline electrolyte.

The same calculations may be repeated when the modulator, being in Position 2, puts the source $E_2'$ instead of the source $E_2$ in circuit, and result in the same conclusions as regards the source $E_2'$. In addition, the intensity I taken in modulus, having the same expression with the two sources $E_2$ and $E_2'$ whose E. M. F.'s and internal resistances are nominally equal, the Expression 7 gives the relative error $$\frac{\Delta I}{I}$$

as a function of the irregularity of the two sources in relation to one another.

Seeing that in practice that which is above all of importance is that I shall keep the same intensity in modulus when the current is reversed, the Expression 8 gives the relative value of the difference of this intensity at the moment of the reversing:

(8) $\quad \frac{\Delta I}{I} = \left| \frac{e_2 - e_1}{e_2} \right| \left[ 1 - \frac{1}{1 + r_1 \left( \frac{1}{r_2} + \frac{1}{r_3} + \frac{1}{R} \right)} \right]$ In this expression, $e_2 - e_1$ shows the difference of E. M. F. of the two sources, taken in modulus, at the moment of the reversing.

If the sources $E_2$ and $E_2'$ had been used directly to transmit signals into the transmission channel according to the classical assembly, without the aid of the device, which is the object of the invention, the relation between the relative differences of the E. M. F.'s and those of the current would have been:

(9) $\quad \frac{\Delta I}{I} = \frac{e_2 - e_1}{e_2}$ the factor $$\left[ 1 - \frac{1}{1 + r_1 \left( \frac{1}{r_2} + \frac{1}{r_3} + \frac{1}{R} \right)} \right]$$

being always lower than 1, the comparisons of the Expressions 8 and 9 brings to light that the device invented gives a means of adjusting by a standard E. M. F. ($e_1$) the voltage between the input terminals $A_1$, $A_2$ of a telegraph transmission channel.

When the Condition 6 is not exactly fulfilled, the current $i_1$ is positive or negative Formula 3 according to the values of the elements in cause: if it is positive, $E_1$ operates as generator; if it is negative $E_1$ operates as receiver. In certain cases, according to the nature of the source $E_1$ it is profitable to deliberately choose one of these two methods of operation rather than the other. For instance, if $E_1$ is a source resulting from rectifying an alternating current by means of rectifying cells, it can only operate as generator. In this case, the assembly elements can be determined so that, taking into account the maximum anticipated variations of these elements, the current $i_1$ can only be zero or positive. By way of a second example, if $E_1$ is a storage battery, its conditions of good upkeep demand a certain balance between its functions as generator and receiver. These conditions are fulfilled either in determining the assembly elements so that taking into account the maximum anticipated variations of said elements, the current $i_1$ is zero on average, or else in deliberately making one of these elements (for instance $r_3$) variable and by modifying it from time to time, automatically or not. When the source $E_1$ can operate as receiver permanently, without inconvenience, and if its internal resistance is zero (or small) $r_3$ may be made infinite thus improving the power efficiency of the system. The Condition 6 does not need, in this case, to be fulfilled to obtain $$\frac{\Delta I}{I} = 0$$

However, standard voltage sources are not as a rule designed to act as permanent receivers of direct-current and this solution is not to be generally considered in practical cases.

When the Condition 5 is fulfilled, the system acts as damper of excessive intensity, as is the result of Formula 7 if the excessive intensity is due to an accidental over-voltage of the source placed in the branch BD, or as it would result from a similar and obvious formula if the excessive intensity is due to an accidental variation of the other elements of the system.

Finally, when the Condition 5 is not fulfilled, the cells are non-conducting and the source $E_1$ is practically cut off from the transmission channel VT, and the source in the branch BD alone delivers then current into the said channel (Figs. 1 and 4). The standard source $E_1$ is then safe from the damages from which it may suffer for instance from a short circuit in the transmission channel. Furthermore, this characteristic may be put to profit for limiting the current in the transmission channel by suitably determining the elements composing the branch BD.

To simplify the description, it has been supposed that the sources $E_2$ and $E_2'$ are separate as this in fact is the case in the majority of telegraph systems in use. They can also be merged in a single source made reversible with the aid of a Wheatstone bridge arrangement.

Fig. 4 gives the wiring diagram. In this figure:
$r_2$ is a resistance.
$r_4$ and $r_5$ are resistances of equal value.
$E_3$ is the single source of the branch BD.
$e_3$ is the E. M. F. of the source $E_3$, P is its internal resistance. The assembly elements other than those which make up the branch BD are the same and are referred to in the same manner as in the Fig. 1.

When the moving part of the modulator M changes its stop, it is known that the difference of potential between the ends B and D of the branch BD undergoes a reversing. The following formulas allow establishing the connection between the E. M. F. $e_3$ and the internal resistance P of the source $E_3$, the resistances $r_2'$ and $r_4$ (or its equal $r_5$) on the one hand (Fig. 4), and the E. M. F. $e_2$ (or its equal $e_2'$) and the resistance $r_2$ on the other hand (Fig. 1) to obtain the same effect:

$$e_2 = e_3 \frac{r_4}{P + 2r_4}$$
$$r_2 = r_4 \frac{(r_4 + P)}{P + 2r_4} + r_2'$$

This variation of the device has the particular characteristic that within the limits allowed by the precision in the equality of the resistances $r_4$ and $r_5$ and the constancy of the E. M. F. $e_3$, the voltage in the branch BD remains the same in modulus when the modulator M changes position. On the other hand, the task of getting a tolerable power efficiency of the device imposes the choice of high resistances $r_4$ and $r_5$; as a result $r_3$ and consequently $e_2$ must be relatively high.

The variation will, therefore, be particularly indicated for a very third-rate source $E_3$. A single source may finally be used in the branch BD, switched over by a reverser according to a known assembly, or any other device allowing the reversing at will of the difference of bias between the points B and D.

Whatever may be the diagram adopted (Fig. 1 or 4 or source with reverser), the source BD in its entirety or partly may be carried in a remote central telegraph station by means of a line, while the rest of the assembly is installed near the units of the telegraph circuits. There is need only to take into account the characteristics of the line (in general the resistance suffices) in determining the elements of the branch BD. According to the characteristics of the invented device, the possible disturbances which may occur on the line are without perceptible effect on the intensity I. Such a modification of the invention is shown on Fig. 5.

The invented device, although applicable in all the cases, is particularly indicated for the units of superphantom and infraacoustic telegraph communications. It obviates the use of relays with double armature or of two reverser relays according to usual form of practice for reversing, under the control of the telegraph apparatus, the voltage applied to the line.

Moreover, a source $E_1$ may be used common to several telegraph transmission channels. Not only does the system according to the invention ensure a constant voltage and without apparent internal resistance at the input of each channel, thus having the advantage of leaving the complete liberty of adjusting the optional trimmer resistances to be placed in line for limiting the current and obviate the disturbances from one channel to another by voltage drop in the source, but it furthermore obviates the drawbacks of accidental misadjustment of these relays and the task of maintenance of their adjustment. Such a variant of the invention is shown on Fig. 6.

When the reactance of the transmission channel VT is not small it is preferable to replace in the formulas and in the description, the resistances $r_2$, $r_3$ and R by impedances. The conditions must be satisfied, at least approximately, for all the frequencies of the pass band which the channel presents. An embodiment of the invention including such impedances, each made up, by way of example, of a resistance $r_2$, or $r_3$ and of an inductance $L_2$ or $L_3$, is represented on Fig. 7. On Fig 7 it must be understood that the working circuit VT, represented by its terminals only, may include an inductance L in addition to its resistance R.

In general, the reactance of submarine telegraph channels is not small. With the reservation that this must be taken into account, the invention applies likewise to submarine telegraph. However, in this last application, a separate standard source should be used for each transmission channel.

The device, which is the object of the invention, likewise lends itself to trivalent telegraph modulation, for which the voltage applied to the input of the channel is at times positive, at times negative, at times zero, the positive and negative voltages being equal in modulus. If indeed, the modulator (Fig. 1 or 4) in a position not shown, cuts the branch BD or replaces it by a conductor without E. M. F. the four cells $C_1$, $C_2$, $C_3$, $C_4$ become non-conducting No current flows in the transmission channel, and the resistance seen from this channel is that which the modulator has put in circuit between the points B and D instead of the branch BD.

Although the present invention has been described in connection with particular examples, it is obviously capable of many variations or modifications, all of which fall within the scope of the appended claims.

What is claimed is:

1. Voltage reversing and regulating device for applying a direct-current voltage to the input terminals of a working circuit of resistance having a value R, in a direction reversible at will, and for maintaining this voltage constant in absolute value irrespective of its direction of application, said device comprising a source of standard direct current voltage of value $e_1$, a plurality of auxiliary sources of direct-current voltage average of value $e_2$ but whose actual voltage may appreciably differ from $e_2$, a connecting-circuit for connecting one selected at will of said auxiliary sources of average voltage $e_2$ on one side directly to one of the terminals of above-said working circuit and on the other side to one of the terminals of a second resistance of value $r_2$, the first terminal of which is connected to the second terminal of said working circuit, a circuit arranged in a Wheatstone bridge having each of its arms constituted by an element of a symmetrical electric conductivity connected in such a direction that current flow through an external circuit connected to a first pair of arm junction points of said Wheatstone bridge is possible only in one direction, the second pair of arm junction points of said Wheatstone bridge being connected to said working circuit, a second resistance connected to said first pair of arm junction points of said Wheatstone bridge and electrical connections for connecting the said standard source to said first pair of arm junction points of said Wheatstone bridge in such a direction that current from said standard source cannot flow through said bridge, above-said voltages and resistance values being chosen so as to fulfill the condition:

$$e_1R(r_2+r_3)+e_1r_2r_3=e_2Rr_3$$

2. A device as in claim 1, wherein the connecting circuit is a manually operated switch or telegraph key.

3. A device as in claim 1, wherein the connecting circuit is a telegraphic modulator.

4. A device as in claim 1, wherein the connecting circuit is a three-direction switch, one of the directions of which corresponds to an auxiliary source of zero electromotive force.

5. A device as in claim 1, wherein one single auxiliary source is used and wherein the connecting circuit consists in a plurality of resistances and in a switch arranged in such a way that operation of said switch reverses the voltage at the terminals of said connecting circuit.

6. A device as in claim 1, wherein at least one of the auxiliary sources, connecting circuit and second resistance are placed at a point remote from the rest of the installation, to which they are connected by means of a two-conductor line.

7. A device as in claim 1, wherein the same source of standard direct-current voltage is used simultaneously in several installations.

8. A device as in claim 1, applicable in the case where the working circuit is a reactive circuit, wherein at least one of the resistances of the device is replaced by a reactive impedance.

RAYMOND JACQUES CHARLES ROQUET.

References Cited in the file of this patent

UNITED STATES PATENTS

| Number | Name | Date |
|---|---|---|
| 1,825,304 | Burnside | Sept. 29, 1931 |
| 1,951,148 | Grinsted | Mar. 13, 1934 |

FOREIGN PATENTS

| Number | Country | Date |
|---|---|---|
| 358,058 | Italy | Apr. 5, 1938 |
| 710,052 | Germany | Sept. 2, 1941 |